United States Patent
Hashiguchi et al.

(10) Patent No.: US 8,369,573 B2
(45) Date of Patent: Feb. 5, 2013

(54) IMAGE PROCESSING APPARATUS AND METHOD

(75) Inventors: Noriyasu Hashiguchi, Kawasaki (JP); Kinya Osa, Tokyo (JP)

(73) Assignee: Canon Kabushiki Kaisha (JP)

(*) Notice: Subject to any disclaimer, the term of this patent is extended or adjusted under 35 U.S.C. 154(b) by 344 days.

(21) Appl. No.: 12/574,274

(22) Filed: Oct. 6, 2009

(65) Prior Publication Data

US 2010/0086177 A1    Apr. 8, 2010

(30) Foreign Application Priority Data

Oct. 6, 2008 (JP) .................................. 2008-259764

(51) Int. Cl.
*G06K 9/00* (2006.01)
(52) U.S. Cl. ........................................................ 382/103
(58) Field of Classification Search .................. 382/103, 382/149, 118
See application file for complete search history.

(56) References Cited

U.S. PATENT DOCUMENTS

2009/0245570 A1* 10/2009 Juza et al. ..................... 382/103

OTHER PUBLICATIONS

Paul Viola and Michael Jones, Robust Real Time Object Detection, Second International Workshop on Statistical and Computational Theories of Vision-Modeling, Learning, Computing, and Sampling, Jul. 13, 2001, Vancouver, Canada.

* cited by examiner

*Primary Examiner* — Claire X Wang
(74) *Attorney, Agent, or Firm* — Rossi, Kimms & McDowell LLP

(57) ABSTRACT

An image processing apparatus which is capable of suppressing an increase in the circuit size of buffers between data-processing circuits, thereby enabling an associated component thereof to be implemented by hardware. A position control unit sequentially shifts a position of a sub window image by a predetermined skip amount in a predetermined scanning direction, for scanning, and further repeating the scanning for skipped sub window images, after shifting a start position of the scanning, to thereby determine positions of all sub window images each as an area from a face image is to be detected.

4 Claims, 8 Drawing Sheets

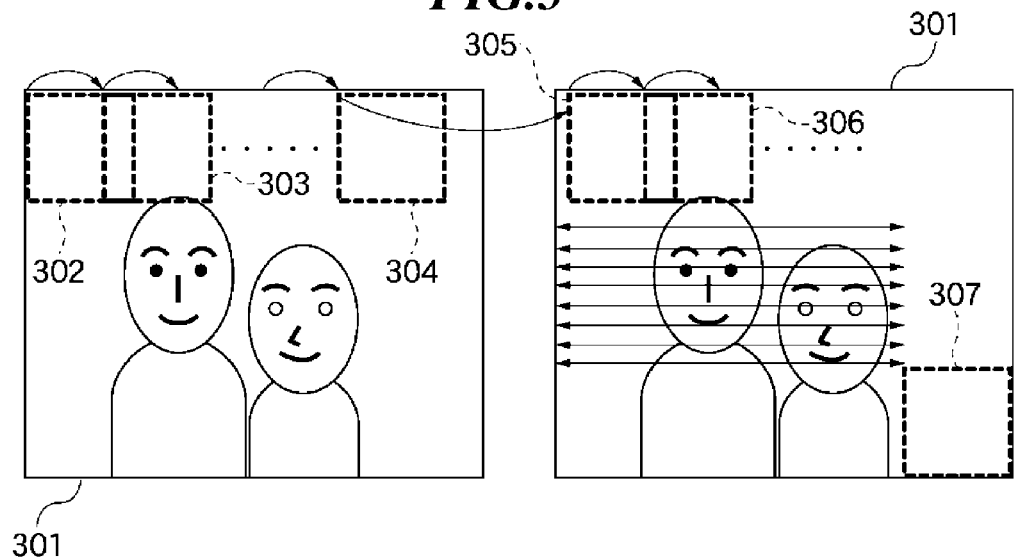
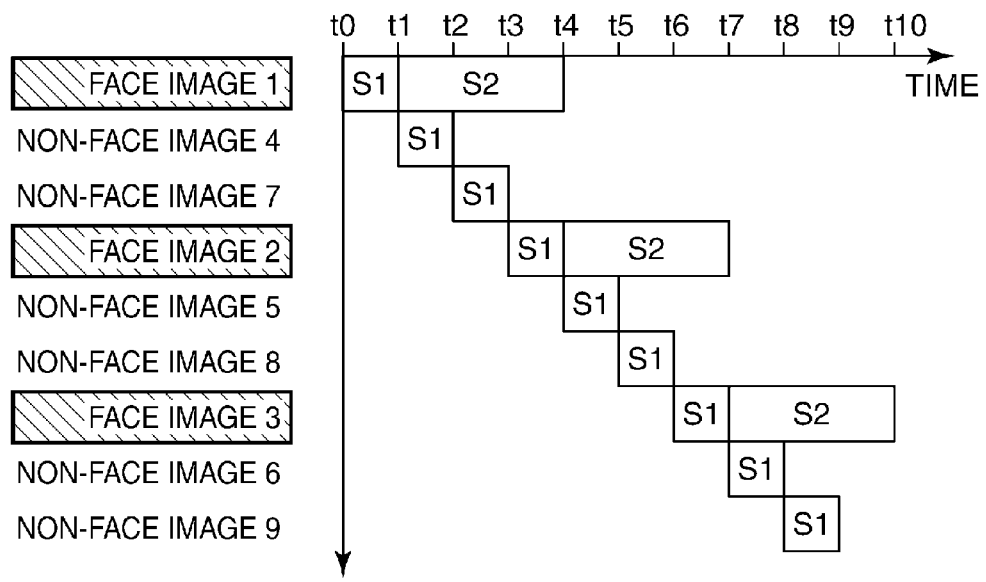

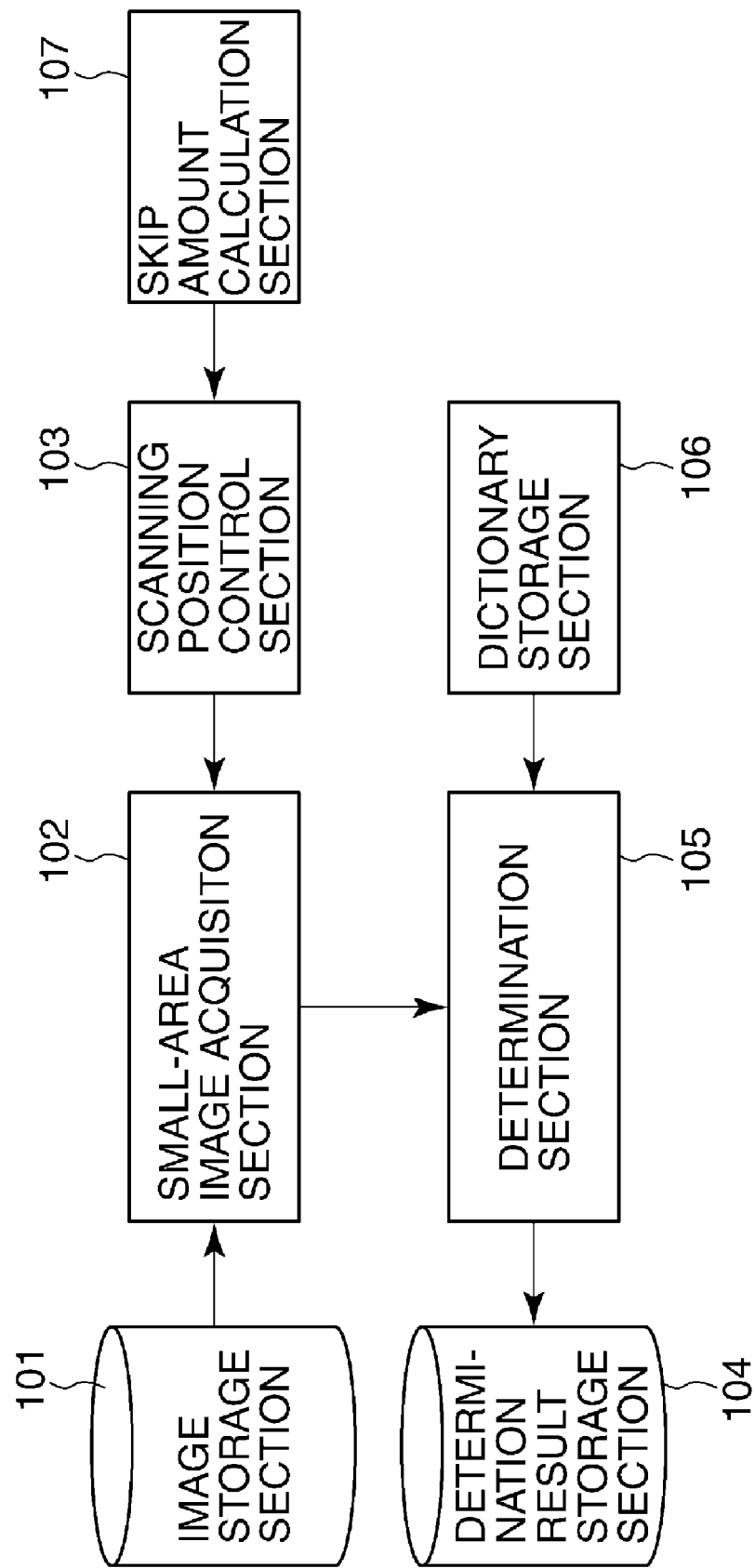

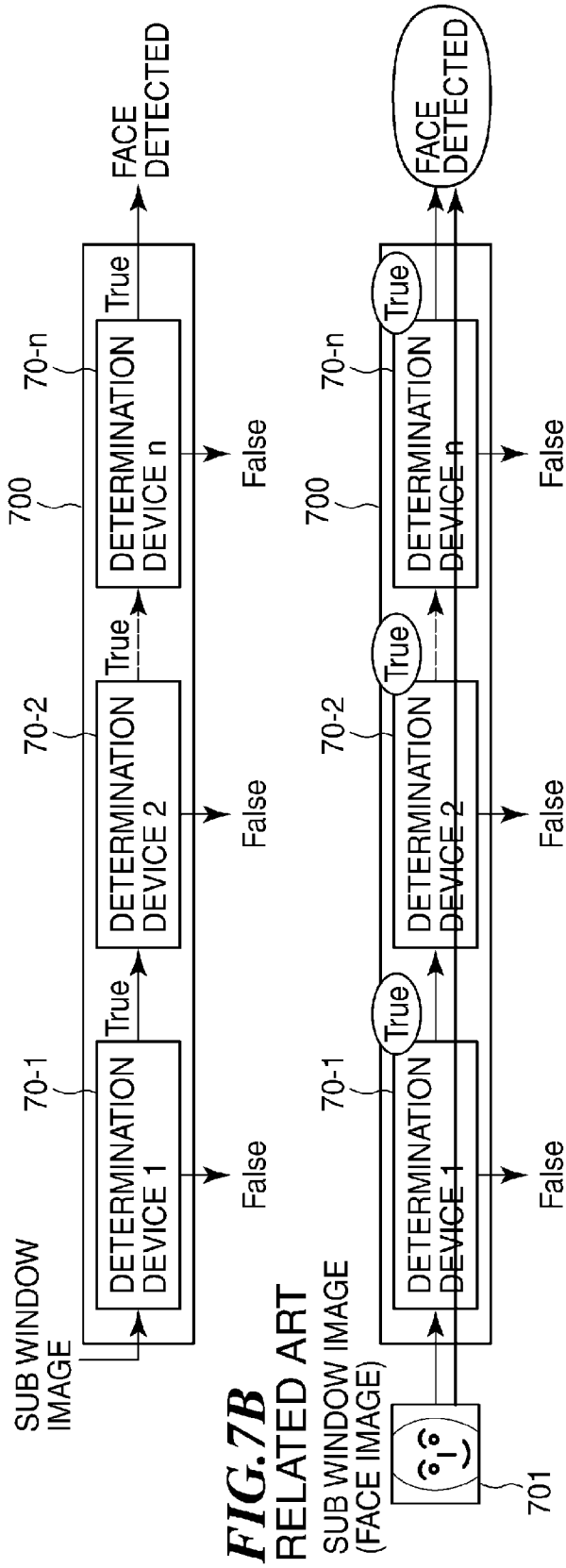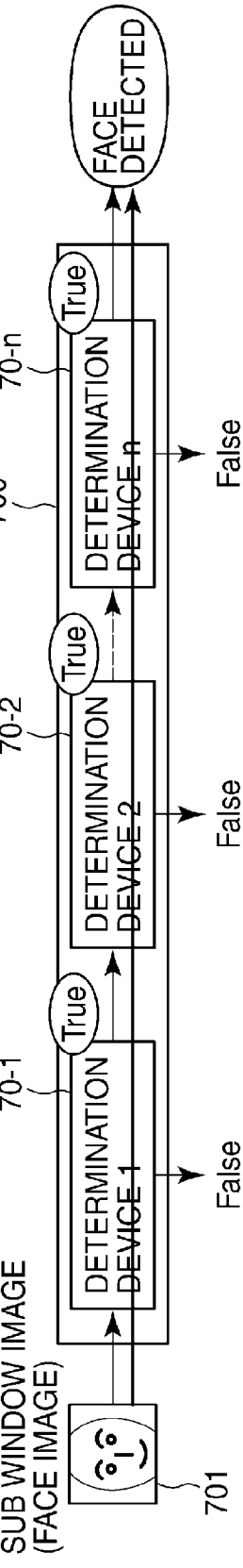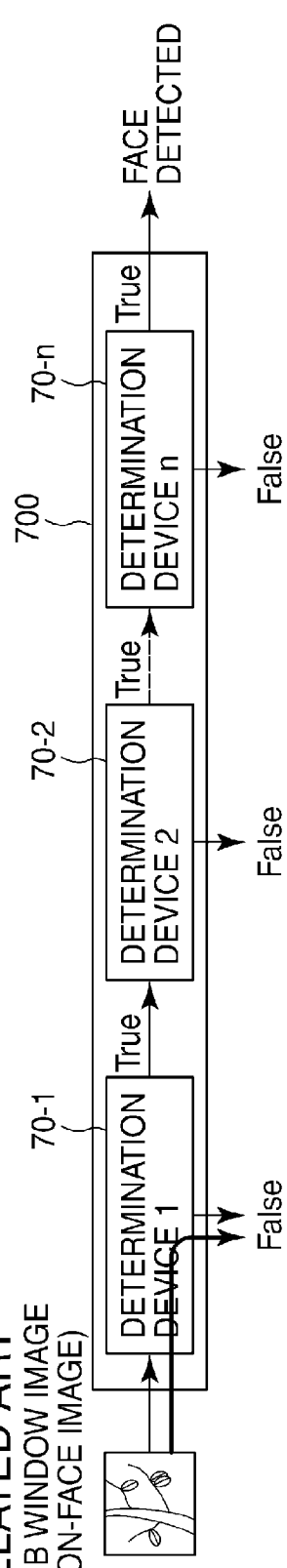

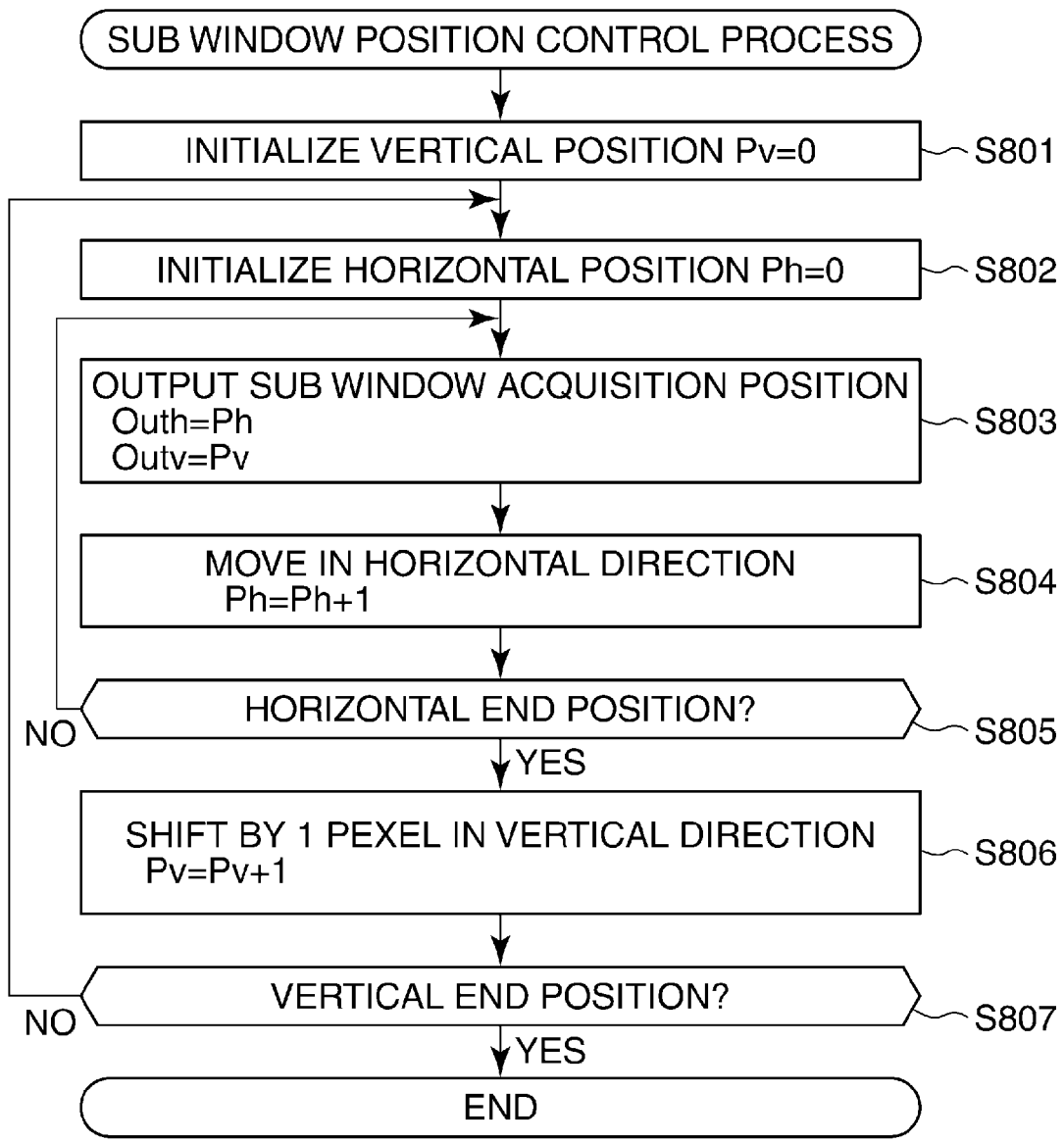

IMAGE PROCESSING APPARATUS AND METHOD

BACKGROUND OF THE INVENTION

1. Field of the Invention

The present invention relates to an image processing apparatus and an image processing method that detect a specific object from an input image.

2. Description of the Related Art

Methods for detecting a specific object from an input image include one proposed by Viola and Jones (see P. Viola and M. Jones, "Robust Real-time Object Detection", SECOND INTERNATIONAL WORKSHOP ON STATISTICAL AND COMPUTATIONAL THEORIES OF VISION, Jul. 13, 2001). According to an algorithm that implements this method, a rectangular small area (hereinafter referred to as "a sub window") is extracted from an input image, and it is determined whether or not a human face is included in the sub window. A description will be given of a determination method with reference to FIG. 7.

FIGS. 7A to 7C are explanatory diagrams of a process for determining (detecting) a specific object (face-detecting process) by a determination processing section of a conventional image processing apparatus.

A determination processing section 700 has a configuration in which a plurality of determination devices 70 (70-1 to 70-$n$) are cascaded, and each determination device determines (detects) that there is a high possibility that the image is a face, or that the image is not a face. The fact that a face is detected by the determination processing section 700 means that it is determined by all of the determination devices that there is a high possibility that the image is a face.

For example, as shown in FIG. 7B, if a sub window 701 which contains a face in a small area thereof is input, the processing by the determination processing section 700 proceeds as indicated by a route 702. The route 702 shows that it is determined by a first determination device 70-1 that the sub window 701 is True ("True" indicates that it is determined that there is a high possibility that the image is a face). Then, it continues to be determined by all of the determination devices from a next determination device 70-2 to a last determination device 70-$n$ that the sub window 701 is True, whereby it is determined that the sub window image 701 contains a face.

On the other hand, as shown in FIG. 7C, if a sub window 703 containing no face in a small area thereof is input, the processing by the determination processing section 700 proceeds as indicated by a route 704. The route 704 shows that it is determined by the first determination device 70-1 that the sub window 703 is False ("False" indicates that it is determined that the image is not a face). By this determination, it is determined that the sub window 703 does not contain any face.

The above-described process indicates that if it is determined by a determination device in a preceding step that the image is not a face, processing to be executed by determination devices in following steps can be omitted. Therefore, the number of steps to be executed for processing of a background part is reduced, which takes much load off the image processing apparatus.

However, since the processing of a face part for the determination is performed by all of the determination devices, the number of steps to be executed is large, which increases load on the devices. Further, also in the vicinity of the face part, there is a tendency that it is determined that the image is not a face in one of the subsequent steps, which makes the load heavier than that on the processing of the background part.

As an example of implementation of the above-described algorithm by hardware, there has been proposed a method of cascading data-processing circuits that perform processes associated with one or a plurality of determination devices. In this method, a buffer for data queue is provided between each adjacent pair of data-processing circuits to prevent input from the preceding step to the following step from being interrupted.

It is envisaged that the size of the buffer is determined when designing the determination processing section 700 such that a sufficient throughput can be ensured even in a state in which the largest load is expected, or such that demanded processing time is ensured.

FIG. 8 is a flowchart of a sub window position control process executed by the conventional image processing apparatus.

A description will be given of a conventional sub window position control method for determining a position of a sub window extracted from an input image with reference to the flowchart in FIG. 8.

In a step S801, a vertical position of a sub window to be extracted is initialized so as to set a start position of the sub window. In a next step S802, a horizontal position of the sub window is initialized so as to set the start position of the same. These steps form an initialization phase.

FIG. 9 is an explanatory diagram showing the movement of the sub window position during the sub window position control process executed by the conventional image processing apparatus.

As an upper left coordinate position of a sub window 902 in an input image 901 to be extracted, a horizontal position of the upper left coordinate position is denoted by Ph, and a vertical position of the same is denoted by Pv, which are respectively initialized to 0. The position of the sub window 902 in the input image 901 shown in FIG. 9 is the initial position of the sub window.

Next, in a step S803, Ph and Pv are respectively assigned to an output horizontal position Outh and an output vertical position Outv, as outputs of the position of the sub window 902 acquired from the input image 901.

Next, in a step S804, the horizontal position Ph is incremented by 1 to update the same so as to move the sub window by one pixel in the horizontal direction. The sub window moved from the position of the sub window 902 by one pixel in the horizontal direction is a sub window 903.

Next, in a step S805, it is determined whether or not the sub window has reached a horizontal end position. In the case of the position of the sub window 902, the answer to the question of the step S803 is NO, so that the process returns to the step S803 to repeat the above-described processing, whereby the sub window is sequentially moved to sub windows 903, 904, et seq. in the horizontal direction.

The sub window is thus sequentially moved in the horizontal direction, and finally the position of a sub window 905 as the horizontal end position is reached. This makes the answer to the question of the step S805 affirmative (YES), thereby terminating the loop of the processing in the horizontal direction. In the following step S806, to shift the sub window by one pixel in the vertical direction, the vertical position Pv is incremented by 1 to update the same.

Next, in a step S807, it is determined whether or not the sub window has reached a vertical end position. Since the position of the sub window 905 is not the vertical end position, the answer to this question is NO, so that the process returns to the step S802 to initialize the horizontal position Ph, which causes the sub window to be placed in the position of the sub window 906.

Thereafter, the movement processing is repeated in the horizontal and vertical directions. When the sub window reaches the position of a sub window 907 at the vertical end position, the answer to the question of the step S807 becomes affirmative (YES), thereby terminating the loop.

Although this is the conventional scanning sequence, the scanning sequence illustrated in FIG. 8 is the same as that of so-called raster scan.

However, the conventional algorithm with which a specific object is detected from an input image has a feature of tendency that sub windows in the vicinity of a specific object each continue to be determined to have a high possibility that the image is of a specific object, up to steps closer to the final step.

Therefore, according to the scanning sequence as illustrated in the sub window position control process in FIG. 8, since the sub window is moved, pixel by pixel, in the horizontal direction, as the sub window is closer to a face to be detected, the processing is more liable to proceed to steps closer to the final step. As a result, heavy load processing is continued, which increase load per unit time.

FIG. 10 is a timing diagram of a sub window image process executed by the conventional image processing apparatus.

A description will be given of why the performance of the apparatus is degraded when the heavy load processing is continued with reference to the timing diagram in FIG. 10. In FIG. 10, the horizontal axis represents time, and the vertical axis represents sub window images and the types of the images, which are sequentially input according to the scan order. Further, the order of arrangement of the sub window images on the vertical axis from the top corresponds to the order of inputting of them from the start.

First, it is assumed as a precondition that determination devices for determining whether or not the possibility that an input image is a face is high are implemented by data-processing circuits (hereinafter referred to as "the stages"). The stages are a stage 1 (S1 in FIG. 10) and a stage 2 (S2 in FIG. 10) which cascaded, and the stage 2 is assumed to require more processing time than the stage 1.

If a sub window image containing a face (face image) is transmitted to such a system, data-processing is performed by the stages 1 and 2 in the mentioned order, and if a sub window image containing no face (non-face image) is transmitted to the system, the data-processing is performed only by the stage 1. If face images 1 to 3 are continuously input, this leads to a state in which the face images 2 and 3 are caused to wait before processing of a preceding face image is completed by the stage 2.

To enable images to wait for processing by the stage 2, it is required to provide buffers between the stages. However, in a case of processing on a sub window-basis, it is necessary to buffer the data for each sub window, and this increases the amount of data to be buffered increased. As a consequence, the size of each buffer circuit becomes so large that it is difficult to implement the determination processing section 700 by hardware.

SUMMARY OF THE INVENTION

The present invention provides an image processing apparatus which is capable of suppressing an increase in the circuit size of buffers between data-processing circuits, thereby enabling an associated component thereof to be implemented by hardware.

In a first aspect of the present invention, there is provided an image processing apparatus that detects a specific object from an image, comprising an acquisition unit configured to acquire, from an input image, a small-area image as an area from which the specific object is to be detected, a position control unit configured to control a position for acquiring the small-area image by said acquisition unit, a dictionary storage unit configured to store a dictionary for use in determining the specific object, and a determination unit configured to determine whether or not the specific object is present in the small-area image, using the dictionary, wherein said position control unit sequentially shifts the position for acquiring the small-area image by a predetermined skip amount in a predetermined scanning direction, for scanning, and further repeating the scanning for skipped small-area images, after shifting a start position of the scanning, to thereby determine positions of all small-area images each as the area from which the specific object is to be detected.

In a second aspect of the present invention, there is provided an image processing method for detecting a specific object from an image, comprising sequentially determining a position for acquiring, from an input image, a small-area image as an area from which the specific object is to be detected, acquiring the small-area image from the determined position, and using a dictionary for determining the specific object, to thereby determine whether or not the specific object is present in the small-area image, wherein said determining a position for acquiring the small-area image includes sequentially shifting the position for acquiring the small-area image by a predetermined skip amount in a predetermined scanning direction, for scanning, and further repeating the scanning for skipped small-area images, after shifting a start position of the scanning, to thereby determine positions of all small-area images each as the area from which the specific object is to be detected.

According to the image processing apparatus of the present invention, it becomes possible to suppress an increase in the circuit size of buffers between data-processing circuits, thereby enabling an associated component thereof to be implemented by hardware.

Further features of the present invention will become apparent from the following description of exemplary embodiments (with reference to the attached drawings).

BRIEF DESCRIPTION OF THE DRAWINGS

FIG. 3 is an explanatory diagram showing movement of a sub window position, performed in the sub window position control process in FIG. 2.

FIG. 4 is a timing diagram of a sub window image process executed by the image processing apparatus in FIG. 1.

FIG. 5 is a block diagram of a face detection unit for detecting a face as a specific object, in an image processing apparatus according to a second embodiment of the present invention.

FIGS. 7A to 7C are explanatory diagrams of a process for determining a specific object executed by a determination processing section of a conventional image processing apparatus.

FIG. 8 is a flowchart of a sub window position control process executed by the conventional image processing apparatus.

DETAILED DESCRIPTION OF THE EMBODIMENTS

The present invention will now be described in detail below with reference to the accompanying drawings showing embodiments thereof.

Figure 1:
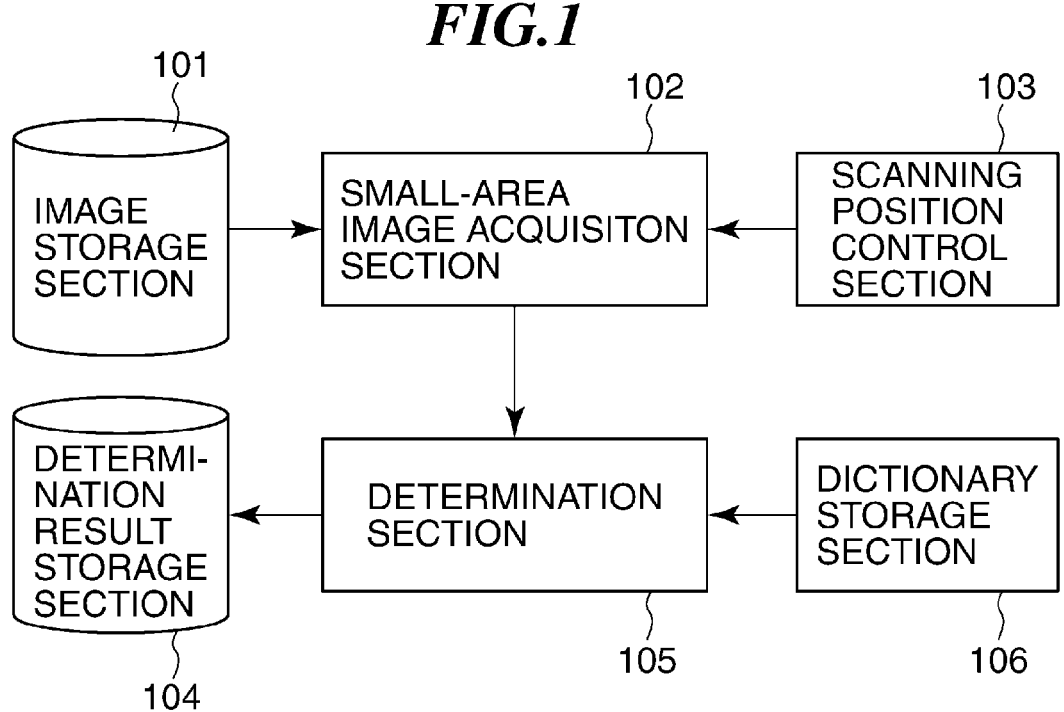
FIG. 1 is a block diagram of a face detection unit for detecting a face as a specific object, in an image processing apparatus according to a first embodiment of the present invention.

FIG. 1 is a block diagram of a face detection unit for detecting a face as a specific object, in an image processing apparatus according to a first embodiment of the present invention.

In FIG. 1, the face detection unit is comprised of an image storage section 101, a small-area image acquisition section 102, a scanning position control section 103, a determination result storage section 104, a determination section 105, and a dictionary storage section 106.

Next, a description will be specifically given of the respective modules of the face detection unit.

The image storage section 101 stores input images, and it is possible to randomly access each of pixels of an input image.

The scanning position control section 103 sequentially determines the position of a sub window to be processed for determination.

The small-area image acquisition section 102 reads a sub window image (small-area image) in the position determined by the scanning position control section 103, and supplies the sub window image to the determination section 105.

The determination section 105 refers to dictionary data stored in the dictionary storage section 106, and determines whether or not there is a face in the sub window image. A result of the determination is stored in the determination result storage section 104 together with sub window position information.

Further, the dictionary data used by the determination section 105 is stored in the dictionary storage section 106, and a coefficient required for determination and a look-up table (LUT) data and the like are also stored in the dictionary storage section 106.

Here, the scanning position control section 103 sequentially computes the position of a sub window image using a predetermined skip amount in a predetermined scanning direction. Further, the scanning position control section 103 repeatedly carries out scanning of skipped sub window images each time shifting the start point for scanning, to thereby control positions of all of the sub window images which are subject to the detection of a face as the specific object.

Figure 2:
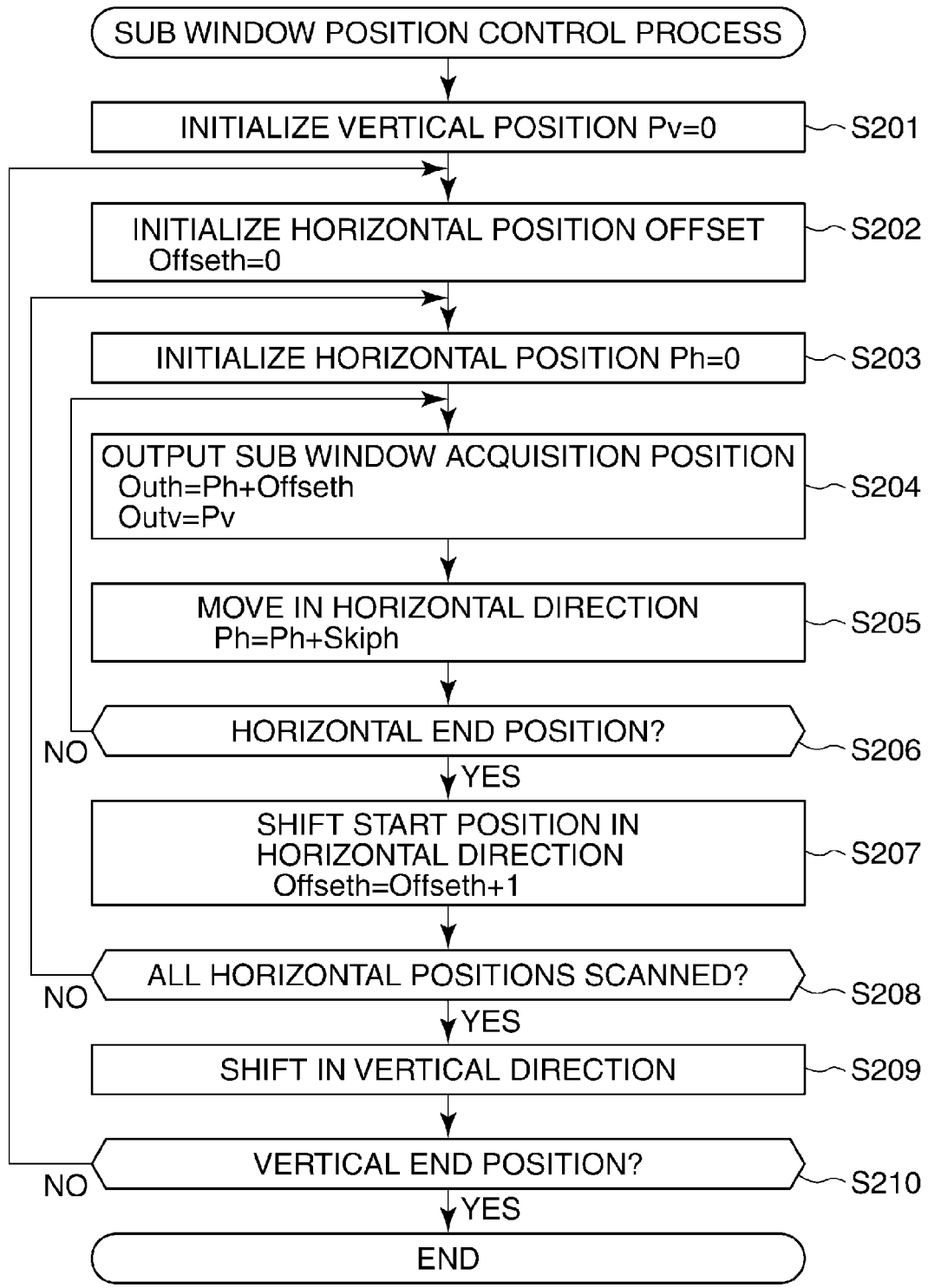
FIG. 2 is a flowchart of a sub window position control process executed by the image processing apparatus in FIG. 1.

FIG. 2 is a flowchart of a sub window position control process executed by the image processing apparatus in FIG. 1. FIG. 3 is an explanatory diagram showing movement of the sub window position, performed in the flowchart in FIG. 2.

The present process is executed by the scanning position control section 103 in FIG. 1. Whenever the sub window position is shifted by this process, the small-area image acquisition section 102 acquires each image of a sub window in the shifted position, and outputs the same to the determination section 105.

The scanning position control section 103 performs processing for determining the left upper coordinate position of a sub window in an input image 301 in FIG. 3.

Referring to FIG. 2, first, in a step S201, the scanning position control section 103 initializes a vertical position Pv to 0 to set a start position of a sub window to be extracted.

Next, in a step S202, the scanning position control section 103 sets a variable, referred to as a horizontal position offset Offseth, to hold an offset amount in the horizontal direction, and initializes the variable by 0.

Next, in a step S203, the scanning position control section 103 initializes a horizontal position Ph by 0 to set the start position of the sub window to be extracted.

Next, in a step S204, the scanning position control section 103 computes the position of the sub window, which is to be notified to the small-area image acquisition section 102. An output horizontal position Outh to be notified is a value obtained by adding the horizontal position offset Offseth to the horizontal position Ph, and an output vertical position Outv is the vertical position Pv. The first output position is the position of a sub window 302.

Next, a step S205 is a process for moving the position in the horizontal direction, and the scanning position control section 103 updates the horizontal position Ph to the value obtained by adding a skip amount Skiph to the horizontal position Ph. The skip amount Skiph, for example, uses the number of pixels corresponding to the width of a possible face image. The position moved from the sub window 302 by processing in the step S205 is the position of a sub window 303.

Next, in a step S206, the scanning position control section 103 checks whether or not the sub window position is a horizontal end position. The horizontal end position is the position of a sub window 304. The position of the sub window 304 is a horizontal end position of a sub window which can be extracted from the input image 301 by the skip amount Skiph and is closest to a horizontal end of the input image 301.

In the case of the position of the sub window 302, it is determined in the step S206 that it is not the end position, so that the answer to this question is negative (NO). Therefore, the process returns to the step S204 to repeat the processing for moving the position of the sub window, using the skip amount Skiph in the horizontal direction, until the position reaches the horizontal end position.

When the processing for moving the position in the horizontal direction proceeds to finally bring the position to that of the sub window 304, i.e. the horizontal end position, the answer to the question of the step S206 becomes affirmative (YES), so that the inner loop of the processing in the horizontal direction is terminated.

Next, in a step S207, the scanning position control section 103 performs processing for adding 1 to the horizontal position offset Offseth to set an offset to the next scan position in the horizontal direction.

Next, in a step S208, the scanning position control section 103 checks whether or not all the positions have been scanned for the horizontal direction. In the present embodiment, the scanning position control section 103 causes the respective positions of sub windows to be each determined after skipping over the skip amount Skiph, and causes all positions of sub windows in the skipped portions to be determined using the horizontal position offset Offseth in the second and subsequent executions of scanning.

Therefore, in the step S208, it is only required to check whether or not the horizontal position offset Offseth becomes equal to the value of the skip amount Skiph.

A first-time scan brings the sub window position to the position of the sub window 304, and hence it is determined in the step S208 that there are skipped portions, so that the answer to the question of the step S208 is negative (NO). Therefore, the process returns to the step S203 to perform a second-time scan.

The second-time scan is started from the position of a sub window 305. The position of the sub window 305 is offset, i.e. shifted in the horizontal direction by the horizontal position offset Offseth from the sub window 302 which is the start position of the first-time scan.

Then, the second-time scan sequentially proceeds to a sub window 305, a sub window 306, and so on, each time skipping over the skip amount Skiph. By repeating the above-described scanning process three, four, or more times, all positions are scanned for the horizontal direction. Then, when all the positions are scanned for the horizontal direction, the answer to the question of the step S208 becomes affirmative (YES), so that the outer loop of the processing in the horizontal direction is terminated.

Next, in a step S209, the position of a sub window is shifted by one pixel in the vertical direction. Specifically, the scanning position control section 103 causes the vertical position Pv to be incremented by 1 to thereby update the vertical position Pv.

Next, in a step S210, the scanning position control section 103 checks whether or not the sub window is moved to the position of a sub window 307, i.e. a vertical end position of the sub window. If the sub window is not moved to the vertical end position, the answer to this question is negative (NO), so that the process returns to the step S202 to perform scanning all positions for the horizontal direction.

When the process returns to the step S202, the sub window is in a position shifted from the sub window 302 by the Pv pixels in the vertical direction.

Thereafter, the processing for scanning all positions in a skipping fashion in the horizontal direction is advanced in a manner shifting in the vertical direction. This processing is repeated until the position of the sub window reaches the position of the sub window 307, i.e. the end position. When the position of the sub window reaches the sub window 307, the answer to the question of the step S210 becomes affirmative (YES), so that the whole loop is terminated.

The position control shown in the present embodiment is performed by determining all horizontal positions in the same vertical position, and then shifting the vertical position.

However, it is also possible to obtain the same advantageous effects by a method of scanning the image by determining, in a first-time scan, horizontal positions in a skipping manner, and whenever reaching a horizontal end position, displacing a vertical position, and in second and following scans, the positions determined in the first-time scan are sequentially shifted to thereby determine all the positions. Further, it is also possible to obtain the same advantageous effects by a method in which the concept of the conventional scanning sequence is inverted by swapping the horizontal positions and the vertical positions, to thereby perform scanning in the vertical direction.

That is, this method is identical to the above-described method of the position control of the present embodiment in respect of the point that the image is repeatedly scanned in a skipping manner, thereby determining all the positions of sub windows.

FIG. 4 is a timing diagram of a sub window image process executed by the image processing apparatus in FIG. 1.

When the inputting order of the sub windows in the vicinity of the specific object is dispersed in a time axis direction by the above-described method, it becomes as illustrated in FIG. 4.

Figure 10:
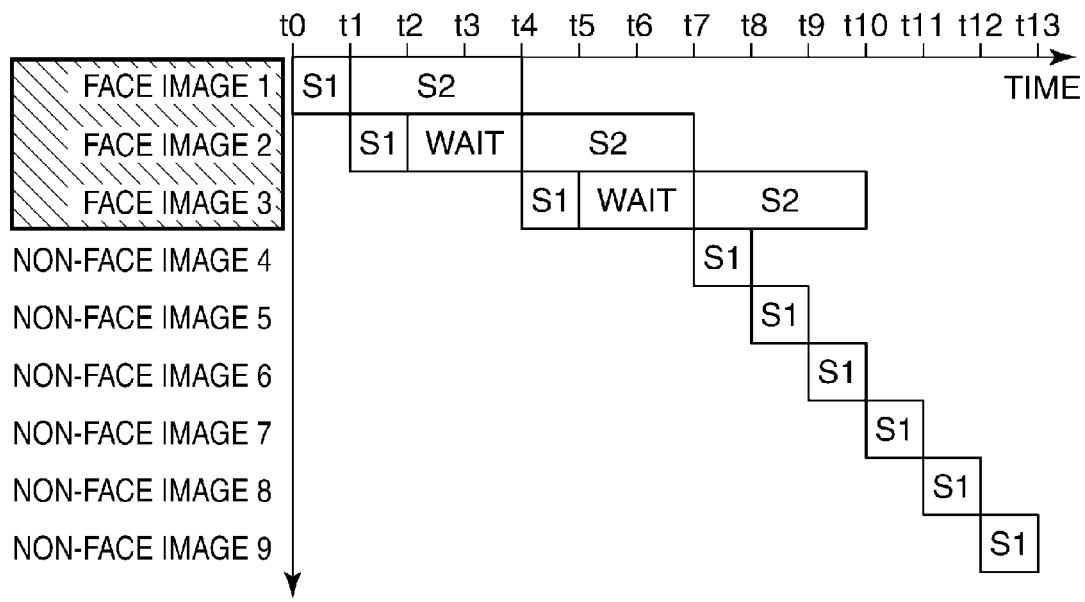
FIG. 10 is a timing diagram of a sub window image process executed by the conventional image processing apparatus.

In the conventional scan order shown in FIG. 10, the face images 1, 2, and 3 are successive, and then, non-face images 4 to 9 are successive. However, by applying the scan order of the present invention, a non-face image is put between successive face images in the order of processing, which make it possible to reduce occurrence of waiting for completion of processing before a position shift. In FIG. 4, since the non-face images corresponding to not shorter than processing time required by the stage 2 are put between the face images, it is possible to completely eliminate the occurrence of waiting for completion of processing before a position shift.

Although in the present embodiment, the description has been given, assuming that the skip amount Skiph is fixed in advance, it is possible to store appropriate skip amounts as parameters in the dictionary storage section 106 together with dictionaries, and change the skip amount according to switching between the dictionaries.

In this case, the skip amount Skiph used by the scanning position control section 103 is set to a selected appropriate one of the skip amounts stored in the dictionaries, which makes it possible to perform scanning in which the processing load is dispersed.

The necessity of appropriately switching between the skip amounts depending on the dictionary will be given hereafter.

For example, an area of a face and an area in the vicinity of the face are different between a case where a face is detected using a dictionary for a sub window of 10×10 pixels, and a case where a face is detected by a dictionary for a sub window of 20×20 pixels.

As a specific example, if a skip amount of 4 pixels is optimum for the sub window of 10×10 pixels, it is favorable to double the skip amount to 8 pixels for the sub window of 20×20 pixels.

This is because if the amount of movement for the sub window of 10×10 pixels is applied to the amount of movement for the sub window of 20×20 pixels, a sub window of a face and a sub window in the vicinity of the face become successive, which causes load concentration.

FIG. 5 is a block diagram of a face detection unit for detecting a face as a specific object, in an image processing apparatus according to a second embodiment of the present invention.

As another method of determining a skip amount, a skip amount calculation section 107 appearing in in FIG. 5 may be provided for calculation of the skip amount.

Sub window sizes are stored in advance in the dictionary storage section 106 in association with respective dictionaries, and the skip amount calculation section 107 determines a skip amount by multiplying, by a predetermined coefficient, a sub window size associated with a dictionary which is selected by switching between the dictionaries.

This calculation is not limited to the multiplication using the predetermined coefficient, but it is only required to determine the skip amount from a sub window size by a predetermined calculation formula. The sub window size is sometimes required to be changed when an object to be recognized is changed, and in this case, it is possible to calculate an appropriate skip amount from the sub window size. This makes it possible to set the appropriate skip amount, so that it possible to maintain dispersibility of heavy load processing.

Further, although in the present embodiment, the description has been given of the case where all sub window positions in the image are determined, and it is determined whether or not a face is included in the image of a sub window in each sub window position, it often occurs that detection of a face is required to be performed only on skin color portions. Therefore, only skin color portions are sometimes extracted by preprocessing. In this case, the face detection processing is only required to be performed in the areas extracted by the preprocessing.

Figure 6:
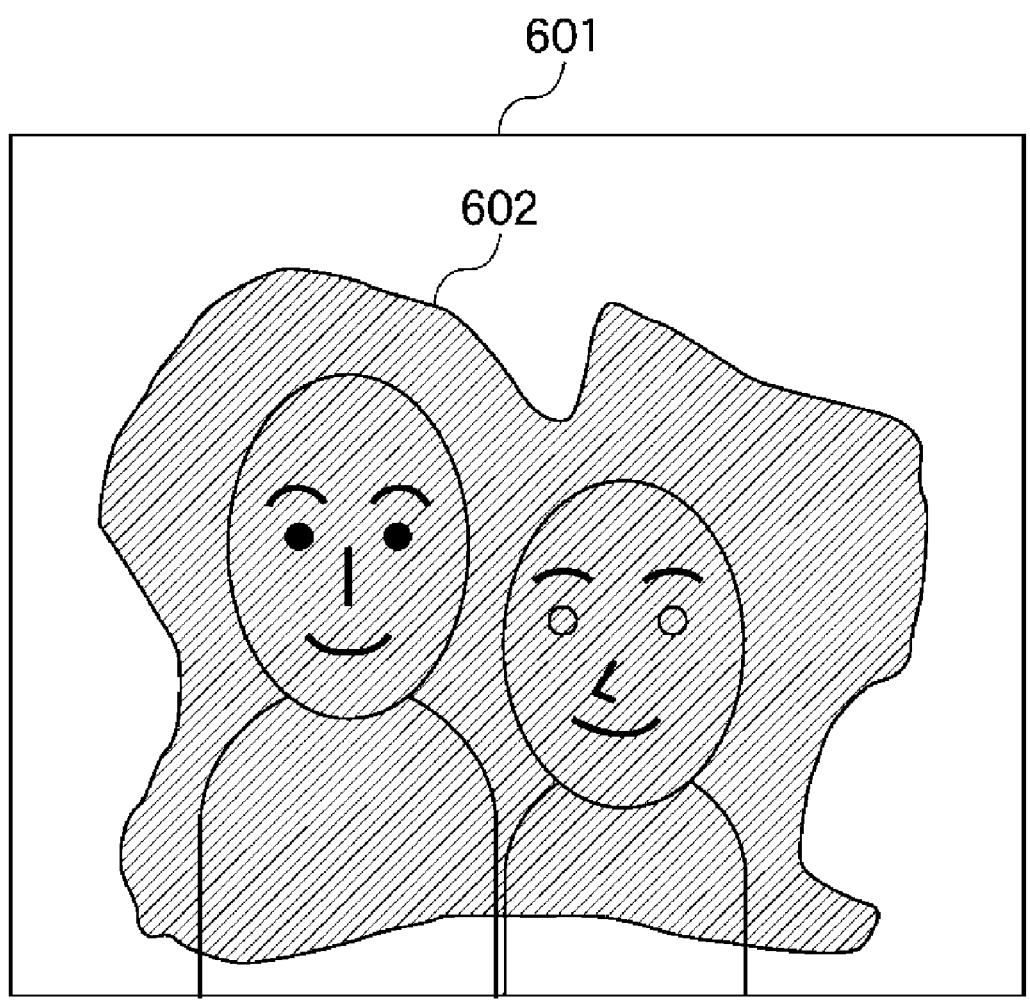
FIG. 6 is an explanatory diagram of a face detection process executed by the image processing apparatus in FIG. 5.
Figure 9:
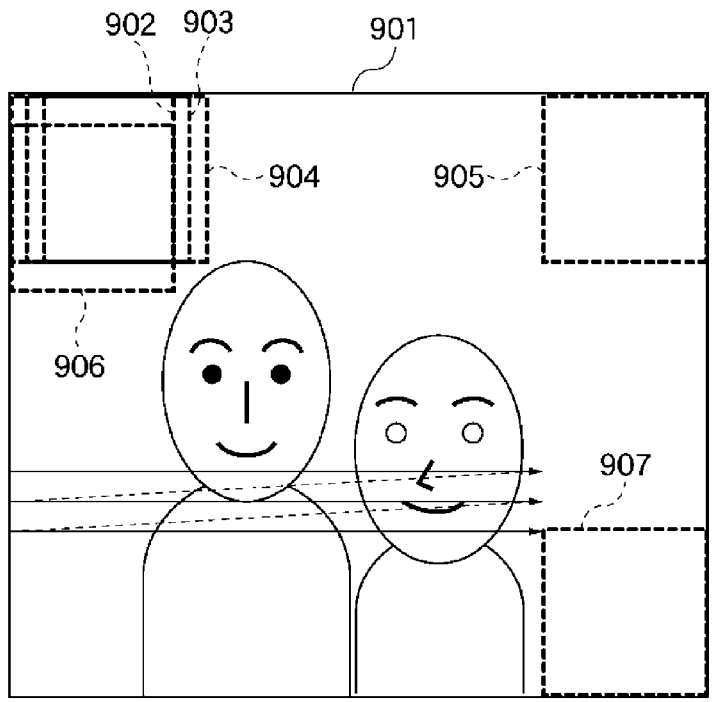
FIG. 9 is an explanatory diagram showing movement of a sub window position during the sub window position control process executed by the conventional image processing apparatus.

FIG. 6 is an explanatory diagram of a face detection process executed by the image processing apparatus in FIG. 5.

For example, if skin color potions are extracted from an input image 601 shown in FIG. 6 by preprocessing, the skin color portions become face parts and portions of background and arms in skin color, as shown by an area 602, and hence the detection process is performed on the area 602. By applying the present invention to the area 602 extracted by the aforementioned preprocessing to perform scanning such that the preprocessed data is read out in a skipping manner, it is possible to obtain the same advantageous effects.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-259764 filed Oct. 6, 2008, which is hereby incorporated by reference herein in its entirety.

What is claimed is:

1. An image processing apparatus that detects a specific object from an image, the image processing apparatus comprising:
   a small-area image acquisition section configured to acquire, from an input image, small-area images each as an area from which the specific object is to be detected;
   a scanning position control section configured to control a position for acquiring each of the small-area images acquired by said small-area image acquisition section;
   a dictionary storage section configured to store a dictionary for use in determining the specific object; and
   a determination section configured to determine whether or not the specific object is present in each of the small-area images, using the dictionary,
   wherein said scanning position control section:
   sequentially designates a succeeding vertical position in the input image after a completion of scanning in a preceding horizontal line through a preceding vertical position;
   designates a horizontal position in a present horizontal line by sequentially moving from a starting position by a predetermined skip amount in the present horizontal line to sequentially acquire the small area images; and
   repeats the scanning process in the same horizontal line starting with a new starting position that is shifted from the previous starting position of the preceding scanning process of the same horizontal line, and sequentially moves from the new starting position by the predetermined skip amount, until all of the small-area images in the same horizontal line are acquired.

2. The image processing apparatus according to claim 1, wherein said dictionary storage section stores the predetermined skip amount used by said scanning position control section.

3. The image processing apparatus according to claim 1, further comprising:
   a skip amount calculation section configured to calculate the skip amount by a predetermined calculation formula from a size of one of the small-area images,
   wherein the skip amount obtained by said skip amount calculation section is set as the skip amount used by said scanning position control section.

4. An image processing method of detecting a specific object from an image, the image processing method comprising the steps of:
   acquiring, from an input image, small-area image each as an area from which the specific object is to be detected;
   controlling a position for acquiring each of the small-area images acquired in the acquiring step;
   storing a dictionary for use in determining the specific object in a dictionary storage section;
   wherein the position controlling step:
   sequentially designates a succeeding vertical position in the input image after a completion of scanning in a preceding horizontal line through a preceding vertical position;
   designates a horizontal position in a present horizontal line by sequentially moving from a starting position by a predetermined skip amount in a the present horizontal line to sequentially acquire the smaller area images; and
   repeats the scanning process in the same horizontal line starting with a new starting position that is shifted from the previous starting position of the preceding scanning process of the same horizontal line, and sequentially moves from the new starting position by the predetermined skip amount, until all of the small-area images in the same horizontal line are acquired.

* * * * *